July 1, 1958 F. C. HALLDEN 2,841,700
REMOTE-CONTROL APPARATUS
Filed April 4, 1957
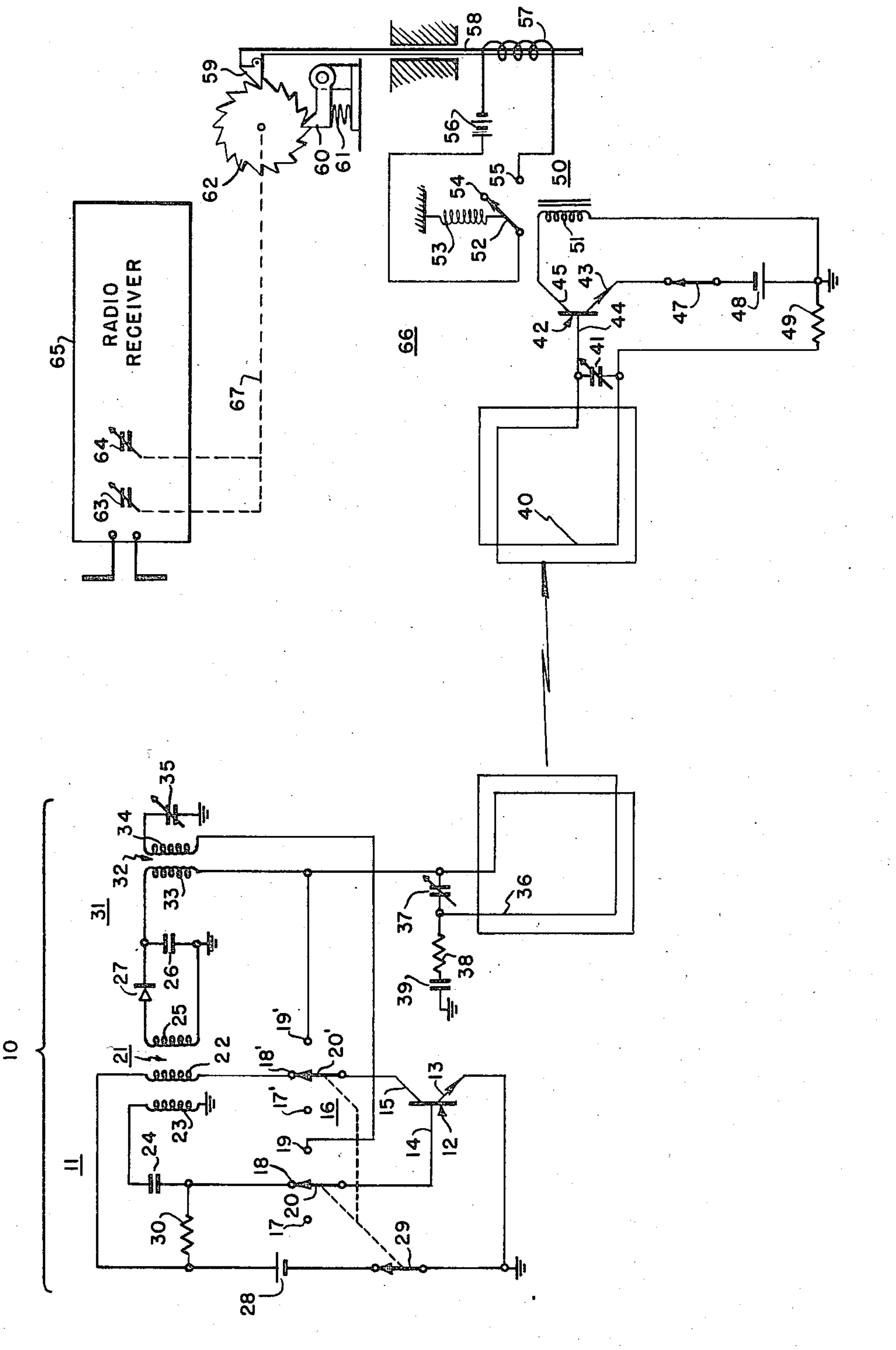

United States Patent Office 2,841,700
Patented July 1, 1958

2,841,700

REMOTE-CONTROL APPARATUS

Frederick C. Hallden, Floral Park, N. Y., assignor to Hazeltine Research, Inc., Chicago, Ill., a corporation of Illinois Application April 4, 1957, Serial No. 650,650
15 Claims. (Cl. 250—2)

*General*

The present invention is directed to remote-control apparatus and, more particularly, to such apparatus which requires a very small power supply but is capable of developing radio-frequency output power at a rather high level. While the apparatus has a variety of applications, it has particular utility for the push-button remote control of radio receivers. Accordingly, the invention will be described in that environment.

In the home it may be desirable to turn on or off or to tune a radio receiver which is remotely located from the operator's easy chair. Various apparatus have been developed for the remote control of radio receivers. In general, that apparatus has the disadvantage of being rather complex and costly and requires a moderate amount of power for its operation. Ideally, such apparatus should be rather simple, inexpensive, portable, and should have a small self-contained power supply so that the apparatus is free from unsightly and hazardous wires intended for use in connecting to the power supply system of the home.

It is an object of the invention, therefore, to provide a new and improved remote-control apparatus which avoids one or more of the above-mentioned limitations of prior such apparatus.

It is another object of the present invention to provide a new and improved remote-control apparatus which requires only a small, extremely lightweight, and very inexpensive self-contained power supply therefor.

It is a further object of the invention to provide a new and improved remote-control apparatus which is portable and which does not have any power supply leads extending therefrom that are unattractive and present the possibility of being tripped over by a householder.

In accordance with a particular form of the invention, a remote-control apparatus comprises an oscillator including a transistor having emitter, base, and collector electrodes, a selector switch, and means including a source of a small voltage which in one position of the switch applies to those electrodes operating biases effective to establish oscillations at a low power level. The remote-control apparatus also includes an energy-storage device and a charging circuit therefor coupled to the oscillator for charging the aforesaid device to a voltage considerably greater than the above-mentioned small voltage. The apparatus further includes a radio-frequency power oscillator including the transistor, the energy-storage device, and the switch which in another position thereof connects the aforesaid greater voltage in circuit with the electrodes of the transistor for applying thereto operating biases effective to establish oscillations at a high power level.

For a better understanding of the present invention, together with other and further objects thereof, reference is had to the following description taken in connection with the accompanying drawing, and its scope will be pointed out in the appended claims.

The drawing is a circuit diagram, partly schematic, of a complete remote-control system including a remote-control apparatus in accordance with a particular embodiment of the invention.

*Description of system including remote-control apparatus*

In the drawing, there is disclosed a remote-control apparatus 10 for transmitting bursts of high-frequency oscillations at a relatively high power level to a control unit 66 for a radio receiver 65 for controlling the tuning thereof. The receiver may be in a suitable position in the home while the apparatus 10 may be some distance therefrom such as near the armchair of the listener. As will become apparent hereinafter, the apparatus 10 can be small and portable and does not require any wires for connecting it to the home power supply system. The apparatus 10 and the receiver 65 together with the control unit 66 for the receiver constitute a remote-control system.

The remote-control apparatus 10 comprises an oscillator 11 including a transistor 12 having emitter, base, and collector electrodes 13, 14, and 15, respectively, a selector switch 16 in the form of a double-pole switch having unicontrolled switch blades 20 and 20', a first feedback means in the form of a transformer 21 coupled in one position of the switch 16 between the collector and emitter electrodes, and means including a source 28 of a small unidirectional voltage which in one position of the switch applies to the aforesaid electrodes operating biases effective to establish oscillations at a low power level. The oscillator 11 is preferably of the blocking oscillator type and the transistor 12 may be of any suitable type such as the grown-junction, the diffused-junction, or of the plated-junction types. For convenience, this transistor will be considered as an N–P–N junction transistor.

The transformer 21 has a primary winding 22, one terminal of which is connected to the collector electrode 15 through a switch point 18' and the switch blade 20' while the other terminal is connected to the positive terminal of the source 28. The negative terminal of the latter is connected through a single-pole switch 29 to the grounded emitter 13 of the transistor. Switch 29 is preferably unicontrolled with the selector switch 16. Transformer 21 has a secondary winding 23, one terminal of which is grounded while the other terminal thereof is connected through a blocking condenser 24, switch point 18, and the switch blade 20 to the base electrode 14 of the transistor 12. A condenser-discharging resistor 30 together with the condenser 24 and the transformer 21 are so chosen that the oscillator 11 functions as a blocking oscillator. The pulse-repetition rate of the latter is largely determined by the time constant of the resistor 30 and the condenser 24. For some applications, however, the elements 24 and 30 may be omitted and the oscillator will make use of the hole-storage time phenomenon of the transistor 12 to control its blocking action. The source of unidirectional potential 28 may be a small dry cell such as a small flashlight battery or mercury cell capable of delivering a representative potential of about 1.5 volts. Such a battery is very inexpensive and may readily be purchased in many stores. The selector switch 16 also includes a pair of switch points 17 and 17' which constitutes the "Off" positions for the switch blades 20 and 20'.

The remote-control apparatus 10 also includes an energy-storage device in the form of an energy-storage condenser 26 having a capacitance of the order of 1 microfarad and a charging circuit for that condenser comprising a tertiary winding 25 of the transformer 21 and a rectifier 27 which are inductively coupled to the oscillator for rectifying its oscillations and step-charging the condenser 26 with unidirectional pulses of energy to a unidirectional voltage which is considerably greater than the aforesaid small voltage supplied by the source 28. The elements 25, 26, and 27 are connected in a series circuit with one terminal of the condenser 26 grounded.

The remote-control apparatus additionally comprises a radio-frequency power oscillator 31 including the transistor 12, the energy-storage condenser 26, a second feedback means in the form of a transformer 32, and the selector switch 16 which in another position thereof, to be described hereinafter, disconnects the source 28 and connects the condenser 26 with its greater voltage in circuit with the transistor electrodes for applying thereto operating biases effective to establish oscillations at a high power level. One terminal of the primary winding 33 of the transformer 32 is connected to the junction of the rectifier 27 and the condenser 26 while its other terminal is connected to a switch point 19′ associated with the switch blade 20′ of the selector switch 16. The secondary winding 34 of transformer 32 has one terminal connected to ground through a tuning condenser 35 while its other terminal is connected to a switch point 19 associated with the switch blade 20 of selector switch 16. It will now be clear that with the switch blades 20 and 20′ connected to the switch points 19 and 19′, respectively, the selector switch 16 is connected in the other operating position mentioned above.

The remote-control apparatus 10 additionally includes means which may be in the form of a loop antenna system for radiating the bursts of oscillations developed by the power oscillator 31. To that end, the antenna system includes a small loop 36 which is tuned by adjustable condenser 37 to resonate at the frequency of the power oscillator established by the tuning elements 34 and 35. One terminal of the loop 36 is connected to the switch point 19′ while the other terminal thereof is connected to ground through an isolating resistor 38 and a blocking condenser 39.

The control unit 66 for the radio receiver 65 has a loop 40 tuned to resonate with the loop 36 by an adjustable condenser 41. One terminal of the loop 40 is connected to the base electrode 44 of a transistor 42 while the other terminal thereof is connected to the emitter 43 through a resistor 49 and a battery 48 whose positive terminal is connected to ground and whose negative terminal is connected through a single-pole switch 47 to that emitter. The collector 45 of the transistor 42 is connected to ground through a winding 51 of a relay 50. One terminal of a solenoid 57 is connected through a battery 56 to the armature 52 of the relay 50 while its other terminal is connected to a relay contact 55. A spring 53 is connected to the armature 52 for normally biasing the latter into engagement with the upper contact 54 of the relay. A ratchet wheel 62 is connected by suitable coupling means 67 to the rotors of the tuning condensers 63 and 64 in the radio-frequency and oscillator-modulator portions of the receiver 65. A pawl 59 having an extension 58 within the region of influence of the solenoid 57 is effective to actuate the ratchet wheel 62 in a step-by-step manner. A pivoted dog 60 is resiliently urged by a spring 61 against a selected one of the notches in the ratchet wheel 62 for maintaining the latter in its proper position after being actuated by the pawl 59 and the solenoid 57.

*Operation of system including remote-control apparatus*

In considering the operation of the remote-control system described above, it will be initially assumed that the radio receiver 65 has been turned on, the switch 47 thrown to its closed position, and switch 29 and selector switch 16 connected as represented in the drawing. The source 28 then applies with reference to the base electrode 14 a forward bias to the emitter electrode 13 and a reverse bias to the collector electrode 15. Inductive feedback between the collector and emitter circuits of the transistor 12 is afforded by the windings 22 and 23 of the transformer 21 and this, together with the described operating biases, is effective to establish oscillations at a low power level. The condenser 24 charges rapidly through the transistor 12 and then discharges more slowly through the resistor 30. During the discharge interval, little or no collector current flows in the transistor 12 and the oscillator 11 blocks. This cycle of action continues and periodic pulses of energy are supplied by the tertiary winding 25 to the rectifier 27 which develops a series of unidirectional pulses of energy which serve to charge the energy-storage condenser 26 to a voltage that is considerably greater than that of the source 28. For example, in a practical embodiment of the invention, the condenser 26 may charge to a potential of about 30 volts. If it is then desired to alter the tuning of the radio receiver 65, the selector switch 16 may be thrown to its other position so that the switch blades 20 and 20′ are connected to their corresponding switch points 19 and 19′. This operation effectively removes various of the windings of the transformer 21 and the source 28 from the circuit of the transistor 12, thus effectively disabling the blocking oscillator 11.

It will be noted, however, that the radio-frequency power oscillator 31 now includes the transistor 12 in its circuit. The potential stored in the condenser 26 serves to bias the emitter electrode 13 in the forward direction and the collector electrode 15 in the reverse direction and, since feedback is supplied by the windings 33 and 34 of transformer 32 between the collector and base electrodes of the transistor 12, oscillations are developed for application by the collector circuit to the tuned loop 36. These oscillations occur for a period of time depending upon the duration of the charge on the condenser 26. For example, 0.1 ampere pulses at a potential of 30 volts and having a duration of about 100 microseconds may be developed. The peak power would then be about 3 watts whereas the power supplied from the battery with the selector switch 16 in its initial position, as represented in the drawing, would be about 0.045 watt. Manual operation of the selector switch 16 to the left so that engagement is made with contacts 18 and 18′ again places the apparatus 10 in a position such that the blocking oscillator 11 proceeds to oscillate and charges up the condenser 26. This charging operation would take place in a few hundredths of a second and the selector switch 16 may then be thrown to the right for engagement with the switch points 19, 19′ so as to disable the oscillator 11 and place the power oscillator 31 in circuit, thus developing and radiating another burst of radio-frequency oscillations.

These radiated bursts of energy are intercepted by the loop 40 of control unit 66 and are applied to the emitter-base circuit of the transistor 42 which performs a detection operation and translates the detected signal to the collector circuit of the transistor. A detected single burst of energy creates a flow of unidirectional current in the winding 51 of the relay 50 which thereupon attracts the armature 52 and the latter makes engagement with the contact 55, thereby completing the circuit through the solenoid 57. Energization of the solenoid actuates the pawl 59 which, in turn, rotates the ratchet wheel 62 one notch. The termination of the flow of current through the winding 51 after the reception of a burst or pulse of energy effects the release of the armature 52 and the spring 53 lifts the armature 52 into engagement with the contact 54. The rotation of the ratchet wheel 62 one notch is effective, by means of the coupling 67, to turn the rotors of the condensers 63 and 64 a predetermined amount. If this rotation is not sufficient to tune the receiver to a new station, additional bursts of radio-frequency energy radiated by the loop 36 are effective in the manner explained to actuate the pawl 59 so as to rotate the ratchet wheel 62 to an extent which turns the rotors of the condensers 63 and 64 so as correctly to tune the receiver. When the operator no longer desires to listen to the radio receiver and to use the remote-control apparatus 10, the selector switch 16 and its interconnected switch 29 together with the switch 47 of the unit 66 and the main control switch of the receiver are turned to their Off positions.

It will be seen from the foregoing explanation that a remote-control apparatus in accordance with the present invention is small, inexpensive, portable, has a small self-contained power supply, and is capable of developing from a single transistor a rather high power pulse for signaling or control purposes.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A remote-control apparatus comprising: an oscillator including a transistor having emitter, base, and collector electrodes, a selector switch, and means including a source of a small voltage which in one position of said switch applies to said electrodes operating biases effective to establish oscillations at a low power level; an energy-storage device and a charging circuit therefor coupled to said oscillator for charging said device to a voltage considerably greater than said small voltage; and a radio-frequency power oscillator including said transistor, said device, and said switch which in another position thereof connects said greater voltage in circuit with said electrodes for applying thereto operating biases effective to establish oscillations at a high power level.

2. A remote-control apparatus comprising: an oscillator including a transistor having emitter, base, and collector electrodes, a selector switch, and means including a source of a small voltage which in one position of said switch applies to said electrodes operating biases effective to establish oscillations at a low power level; an energy-storage device and a charging circuit therefor coupled to said oscillator for charging said device to a voltage considerably greater than said small voltage; and a radio-frequency power oscillator including said transistor, said device, and said switch which in another position thereof disconnects said source and connects said device with said greater voltage in circuit with said electrodes for applying thereto operating biases effective to establish oscillations at a high power level.

3. A remote-control apparatus comprising: a blocking oscillator including a transistor having emitter, base, and collector electrodes, a selector switch, and means including a source of a small voltage which in one position of said switch applies to said electrodes operating biases effective to establish oscillations at a low power level; an energy-storage device and a charging circuit therefor coupled to said oscillator in said one position of said switch for charging said device to a voltage considerably greater than said small voltage; and a radio-frequency power oscillator including said transistor, said device, and said switch which in another position thereof disconnects said source and connects said device with said greater voltage in circuit with said electrodes for applying thereto operating biases effective to establish oscillations at a high power level.

4. A remote-control apparatus comprising: an oscillator including a transistor having emitter, base, and collector electrodes, a selector switch, and means including a source of a small unidirectional voltage which in one position of said switch applies to said electrodes operating biases effective to establish oscillations at a low power level; an energy-storage device and a charging circuit therefor including a rectifier coupled to said oscillator for rectifying said oscillations and step-charging said device with unidirectional pulses of energy to a unidirectional voltage considerably greater than said small voltage; and a radio-frequency power oscillator including said transistor, said device, and said switch which in another position thereof connects said greater voltage in circuit with said electrodes for applying thereto operating biases effective to establish oscillations at a high power level.

5. A remote-control apparatus comprising: a blocking oscillator including a transistor having emitter, base, and collector electrodes, a selector switch, and means including a source of a small unidirectional voltage which in one position of said switch applies to said electrodes operating biases effective to establish oscillations at a low power level; an energy-storage device and a charging circuit therefor including a rectifier coupled to said oscillator in said one position of said switch for rectifying said oscillations and step-charging said device with unidirectional pulses of energy at the blocking rate of said oscillator to a unidirectional voltage considerably greater than said small voltage; and a radio-frequency power oscillator including said transistor, said device, and said switch which in another position thereof disconnects said source and connects said device with said greater voltage in circuit with said electrodes for applying thereto operating biases effective to establish oscillations at a high power level.

6. A remote-control apparatus comprising: an oscillator including a transistor having emitter, base, and collector electrodes, a selector switch, and means including a source of a small voltage which in one position of said switch applies to said electrodes operating biases effective to establish oscillations at a low power level; an energy-storage condenser and a charging circuit therefor coupled to said oscillator for charging said condenser to a voltage considerably greater than said small voltage; and a radio-frequency power oscillator including said transistor, said condenser, and said switch which in another position thereof connects said greater voltage in circuit with said electrodes for applying thereto operating biases effective to establish oscillations at a high power level.

7. A remote-control apparatus comprising: an oscillator including a transistor having emitter, base, and collector electrodes, a selector switch, and means including a source of a small voltage which in one position of said switch applies with reference to said base electrode a forward bias to said emitter electrode and a reverse bias to said collector electrode effective to establish oscillations at a low power level; an energy-storage device and a charging circuit therefor coupled to said oscillator for charging said device to a voltage considerably greater than said small voltage; and a radio-frequency power oscillator including said transistor, said device, and said switch which in another position thereof connects said greater voltage in circuit with said electrodes for applying thereto with reference to said base electrode a forward bias to said emitter electrode and a reverse bias to said collector electrode effective to establish oscillations at a high power level.

8. A remote-control apparatus comprising: an oscillator including a transistor having emitter, base, and collector electrodes, a selector switch, a first feedback means coupled in one position of said switch between said collector and emitter electrodes, and means including a source of a small voltage which in one position of said switch applies to said electrodes operating biases effective to establish oscillations at a low power level; an energy-storage device and a charging circuit therefor coupled to said oscillator for charging said device to a voltage considerably greater than said small voltage; and a radio-frequency power oscillator including said transistor, said device, a second feedback means, and said switch which in another position thereof couples said second feedback means between said collector and emitter electrodes and connects said greater voltage in circuit with said electrodes for applying thereto operating biases effective to establish oscillations at a high power level.

9. A remote-control apparatus comprising: an oscillator including a transistor having emitter, base, and collector electrodes, a selector switch, a first inductive feedback means coupled in one position of said switch between said collector and emitter electrodes, and means including a source of a small voltage which in said one position of said switch applies to said electrodes operating biases effective to establish oscillations at a low power level; an energy-storage device and a charging circuit therefor coupled to said oscillator for charging said device to a voltage considerably greater than said small voltage; and a radio-frequency power oscillator including said transistor, said device, a second inductive feedback means, and said switch which in another position thereof couples said second feedback means between said collector and emitter electrodes and connects said greater voltage in circuit with said electrodes for applying thereto operating biases effective to establish oscillations at a high power level.

10. A remote-control apparatus comprising: an oscillator including a transistor having emitter, base, and collector electrodes, a selector switch, a first inductive feedback means coupled in one position of said switch between said collector and emitter electrodes, and means including said feedback means and a source of a small voltage which in said one position of said switch applies to said electrodes operating biases effective to establish oscillations at a low power level; an energy-storage device and a charging circuit therefor coupled to said oscillator for charging said device to a voltage considerably greater than said small voltage; and a radio-frequency power oscillator including said transistor, said device, a second inductive feedback means, and said switch which in another position thereof couples said second feedback means between said collector and emitter electrodes and connects said greater voltage in circuit with said electrodes through said second feedback means for applying to said electrodes operating biases effective to establish oscillations at a high power level.

11. A remote-control apparatus comprising: an oscillator including a transistor having emitter, base, and collector electrodes, a selector switch, a first transformer having a primary winding which in one position of said switch is coupled between said collector and emitter electrodes, a secondary winding which in said one position of said switch is coupled between said base and emitter electrodes, and having a tertiary winding, and means including said primary and secondary windings and a source of a small voltage which in one position of said switch applies to said electrodes operating biases effective to establish oscillations at a low power level; an energy-storage device and a charging circuit therefor coupled to said oscillator for charging said device to a voltage considerably greater than said small voltage; and a radio-frequency power oscillator including said transistor, said device, a second transformer having a primary winding which in another position of said switch is coupled between said collector and emitter electrodes, and a secondary winding which in said other position of said switch is coupled between said base and emitter electrodes, and said switch which in said other position thereof connects said greater voltage in circuit with said electrodes through said windings of said second transformer for applying to said electrodes operating biases effective to establish oscillations at a high power level.

12. A remote-control apparatus comprising: an oscillator including a transistor having emitter, base, and collector electrodes, a selector switch, and means including a source of a few volts which in one position of said switch applies to said electrodes operating biases effective to establish oscillations at a low power level; an energy-storage device and a charging circuit therefor coupled to said oscillator for charging said device to a voltage considerably greater than said few volts; and a radio-frequency power oscillator including said transistor, said device, and said switch which in another position thereof connects said greater voltage in circuit with said electrodes for applying thereto operating biases effective to establish a burst of oscillations at a high power level.

13. A remote-control system comprising: an oscillator including a transistor having emitter, base, and collector electrodes, a selector switch, and means including a source of a few volts which in one position of said switch applies to said electrodes operating biases effective to establish oscillations at a low power level; an energy-storage device and a charging circuit therefor coupled to said oscillator for charging said device to a voltage considerably greater than said few volts; a radio-frequency power oscillator including said transistor, said device, and said switch which in another position thereof connects said greater voltage in circuit with said electrodes for applying thereto operating biases effective to establish a burst of oscillations at a high power level; means for radiating said burst of oscillations; and means for receiving and utilizing said burst of oscillations.

14. A remote-control system comprising: an oscillator including a transistor having emitter, base, and collector electrodes, a selector switch, and means including a source of a few volts which in one position of said switch applies to said electrodes operating biases effective to establish oscillations at a low power level; an energy-storage device and a charging circuit therefor coupled to said oscillator for charging said device to a voltage considerably greater than said few volts; a radio-frequency power oscillator including said transistor, said device, and said switch which in another position thereof connects said greater voltage in circuit with said electrodes for applying thereto operating biases effective to establish a burst of oscillations at a high power level; an antenna for radiating said burst of oscillations; and a radio receiver for receiving said burst of oscillations and including a tuning control means responsive to said received burst for adjusting the tuning of said receiver.

15. A remote-control apparatus comprising: an oscillator including a transistor having emitter, base, and collector electrodes, a selector switch, a first transformer having a primary winding which in one position of said switch is coupled between said collector and emitter electrodes, a secondary winding which in said one position of said switch is coupled between said base and emitter electrodes, and having a tertiary winding, and means including said primary and secondary windings and a source of a small unidirectional voltage which in one position of said switch applies with reference to said base electrode a forward bias to said emitter electrode and a reverse bias to said collector electrode effective to establish oscillations at a low power level; an energy-storage condenser and a charging circuit therefor including a rectifier coupled to said oscillator in said one position of said switch for rectifying said oscillations and step-charging said condenser with unidirectional pulses of energy to a unidirectional voltage considerably greater than said small voltage; and a radio-frequency power oscillator including said transistor, said condenser, a second transformer having a primary winding which in another position of said switch is coupled between said collector and emitter electrodes, and a secondary winding which in said other position of said switch is coupled between said base and emitter electrodes, and said switch which in said other position thereof disconnects said source and connects said condenser with said greater voltage in circuit with said electrodes for applying thereto with reference to said base electrode a forward bias to said emitter electrode and a reverse bias to said collector electrode effective to establish a burst of oscillations at a high power level.

References Cited in the file of this patent

Radio-Electronics, March 1956, "Voice-Powered Telephone," pp. 137, 138.

Tele-Tech & Electronic Industries, August 1956, "Designing Free-Power Transistor Apparatus," p. 66.

Radio and TV News, June 1957, "Geiger Counter with Transistor Power Supply, pp. 35–37.